United States Patent
Suh

(10) Patent No.: US 11,701,974 B2
(45) Date of Patent: Jul. 18, 2023

(54) FUEL CELL VEHICLE

(71) Applicants: Hyundai Motor Company, Seoul (KR); Kia Corporation, Seoul (KR)

(72) Inventor: Jung Do Suh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 191 days.

(21) Appl. No.: 17/392,795

(22) Filed: Aug. 3, 2021

(65) Prior Publication Data

US 2022/0194234 A1 Jun. 23, 2022

(30) Foreign Application Priority Data

Dec. 23, 2020 (KR) .......................... 10-2020-0182054

(51) Int. Cl.
  *B60K 1/04* (2019.01)
  *B60L 50/71* (2019.01)
  *H01M 8/2475* (2016.01)

(52) U.S. Cl.
  CPC ................ *B60L 50/71* (2019.02); *B60K 1/04* (2013.01); *H01M 8/2475* (2013.01); *B60K 2001/0438* (2013.01); *H01M 2220/20* (2013.01)

(58) Field of Classification Search
  CPC ... B60K 1/04; B60K 2001/0438; B60L 50/71; B60Y 2400/202; H01M 2250/20; Y02E 60/50
  See application file for complete search history.

(56) References Cited

U.S. PATENT DOCUMENTS

| 5,992,555 | A | * | 11/1999 | Sakamoto | ............... B60R 21/00 180/232 |
| 7,040,446 | B2 | * | 5/2006 | Anzai | .................... B62D 21/15 180/274 |

(Continued)

FOREIGN PATENT DOCUMENTS

| JP | 6414021 B2 | 10/2018 |
| JP | 6658500 B2 | 3/2020 |
| JP | 2020-069821 A | 5/2020 |

OTHER PUBLICATIONS

Fatigue and Fracture understanding the basics, ASM International, Edited by F.C. Campbell, 2012(<https://doi.org/10.31399/asm.tb.ffub.9781627083034),>), p. 267.

*Primary Examiner* — John D Walters
*Assistant Examiner* — James J Triggs
(74) *Attorney, Agent, or Firm* — Fox Rothschild LLP

(57) ABSTRACT

A fuel cell vehicle is provided and includes a system frame on which a fuel cell is mounted and first and second side members extending in a first direction and facing each other in a second direction intersecting the first direction. A first fastening part fastens the system frame to each of the first and second side members. The system frame includes a first aperture formed therein in a horizontal direction. The first fastening part includes a first support bracket, including a second aperture, a first insertion hole, and a first tab portion extending from the first insertion hole in the horizontal direction, and a first bolt, including a first shank portion inserted into the first aperture, the second aperture, and the first insertion hole in the horizontal direction and a first threaded portion engaged with the first tab portion.

18 Claims, 12 Drawing Sheets

(56) References Cited

U.S. PATENT DOCUMENTS

| | | | | |
|---|---|---|---|---|
| 8,459,699 | B1* | 6/2013 | Auzias | F16L 35/00 |
| | | | | 285/412 |
| 9,079,508 | B2* | 7/2015 | Naito | B60L 1/003 |
| 9,371,009 | B2* | 6/2016 | Ishikawa | H01M 8/2457 |
| 9,499,205 | B1* | 11/2016 | Elia | B60K 6/28 |
| 11,235,670 | B2* | 2/2022 | Yang | B60K 1/04 |
| 2008/0142289 | A1* | 6/2008 | Yang | B60K 1/04 |
| | | | | 180/312 |
| 2012/0015257 | A1* | 1/2012 | Arisawa | B62D 21/152 |
| | | | | 429/400 |
| 2015/0027796 | A1* | 1/2015 | Naito | B60L 1/003 |
| | | | | 180/65.31 |
| 2016/0114667 | A1* | 4/2016 | Ikeda | H01M 50/24 |
| | | | | 180/68.5 |
| 2017/0133691 | A1* | 5/2017 | Yamafuji | H01M 8/04917 |
| 2018/0272889 | A1* | 9/2018 | Nakamura | H01F 37/00 |

* cited by examiner

FUEL CELL VEHICLE

CROSS-REFERENCE TO RELATED APPLICATION(S)

This application claims the benefit of Korean Patent Application No. 10-2020-0182054, filed on Dec. 23, 2020, which is hereby incorporated by reference as if fully set forth herein.

BACKGROUND

Field of the Disclosure

The present disclosure relates to a fuel cell vehicle, and more particularly, to a fuel cell vehicle that enables prevention of breakage of individual components thereof.

Discussion of the Related Art

In general, a vehicle including a fuel cell (hereinafter referred to as a "fuel cell vehicle") travels in various traveling environments. In a fuel cell vehicle, a fuel cell and a system frame, to which the fuel cell is mounted, may be fastened to a side member of a vehicle using bolts. In this case, however, the bolts may break depending on the traveling environment of the fuel cell vehicle. Therefore, research for preventing this problem is underway.

SUMMARY

Accordingly, the present disclosure is directed to a fuel cell vehicle that substantially obviates one or more problems due to limitations and disadvantages of the related art. The present disclosure provides a fuel cell vehicle that enables prevention of breakage of individual components thereof. However, the objects to be accomplished by the exemplary embodiments are not limited to the above-mentioned objects, and other objects not mentioned herein will be clearly understood by those skilled in the art from the following description.

A fuel cell vehicle according to an exemplary embodiment may include a system frame on which a fuel cell is mounted, first and second side members extending in a first direction and facing each other in a second direction intersecting the first direction, the first direction being a direction of vehicle travel, and a first fastening part configured to fasten the system frame to each of the first and second side members. The system frame may include a first aperture formed therein in a horizontal direction.

The first fastening part may include a first support bracket, including a second aperture that communicates with a first end portion, among the two opposite end portions of the first aperture, in the horizontal direction, a first insertion hole that communicates with a second end portion, among the two opposite end portions of the first aperture, in the horizontal direction, and a first tab portion that extends from the first insertion hole in the horizontal direction, and a first bolt, including a first shank portion inserted into the first aperture, the second aperture, and the first insertion hole in the horizontal direction and a first threaded portion that extends from the first shank portion to be engaged with the first tab portion.

For example, the first shank portion of the first bolt may overlap the boundary between the first end portion of the first aperture and the second aperture in a vertical direction, and may overlap the boundary between the second end portion of the first aperture and the first insertion hole in the vertical direction. The vertical direction may be a direction that intersects each of the first direction and the second direction. For example, the first fastening part may fasten a corner of the system frame to each of the first and second side members.

For example, the fuel cell vehicle may further include a first pipe nut embedded in the first support bracket, and the first pipe nut may have therein the first tab portion. For example, one of the system frame and the first support bracket may include a first protruding portion having a convex shape and protruding toward the remaining one of the system frame and the first support bracket, and the remaining one of the system frame and the first support bracket may include a recessed portion to receive the first protruding portion. For example, the first protruding portion may protrude in the second direction.

The system frame may include the first protruding portion, and the first support bracket may include the recessed portion. The first aperture may penetrate the first protruding portion in the horizontal direction. The recessed portion may include a first inner surface facing the front surface of the first protruding portion, a first side portion facing one of the two opposite side surfaces of the first protruding portion and having therein a second aperture, and a second side portion facing the other one of the two opposite side surfaces of the first protruding portion and having therein the first insertion hole and the first tab portion. The first inner surface, the first side portion, and the second side portion may form a space receiving the first protruding portion. The first protruding portion may be located between the first side portion and the second side portion in the horizontal direction.

For example, the first shank portion and the first threaded portion of the first bolt may have a height difference therebetween. For example, the diameter of the first shank portion may be greater than the diameter of the first threaded portion, and the diameter of the first insertion hole may be greater than the diameter of the first tab portion. For example, the first bolt may further include a head having a diameter greater than the diameter of the first shank portion, and the head may be in contact with an end portion of the second aperture.

A fuel cell vehicle according to another exemplary embodiment may include a system frame on which a fuel cell is mounted, first and second side members extending in a first direction and facing each other in a second direction intersecting the first direction, the first direction being a direction of vehicle travel, and a second fastening part configured to fasten the system frame to each of the first and second side members. The system frame may include a second protruding portion that protrudes toward the second fastening part. The second fastening part may have a concave shape to receive at least a portion of the second protruding portion by holding the top surface and the bottom surface of the second protruding portion.

For example, the system frame may include a second insertion hole formed in the second protruding portion in a horizontal direction and a second tab portion that extends from the second insertion hole in the horizontal direction. The second fastening part may include a second support bracket including therein a third aperture that communicates with the second insertion hole in the horizontal direction and a second bolt including a second shank portion, inserted into the third aperture and the second insertion hole in the horizontal direction, and a second threaded portion, engaged with the second tab portion.

For example, the fuel cell vehicle may further include a second pipe nut embedded in the system frame, and the second pipe nut may have therein the second tab portion. For example, the second support bracket may include a second inner surface facing the front surface of the second protruding portion, an upper end disposed on the second inner surface, the upper end being in contact with the top surface of the second protruding portion, and a lower end disposed under the second inner surface, the lower end being in contact with the bottom surface of the second protruding portion. The second inner surface, the upper end, and the lower end may form a space receiving the second protruding portion. The second protruding portion may be located between the upper end and the lower end in a vertical direction.

For example, the second inner surface of the second support bracket may be in contact with the front surface of the second protruding portion. The bottom surface of the upper end of the second support bracket may be in contact with the entire area of the top surface of the second protruding portion, and the top surface of the lower end of the second support bracket may be in contact with the entire area of the bottom surface of the second protruding portion. For example, the upper end and the lower end of the second support bracket may be formed to be respectively caught in the top surface and the bottom surface of the second protruding portion.

For example, the second inner surface of the second support bracket may be spaced apart from the front surface of the second protruding portion in the horizontal direction. The bottom surface of the upper end of the second support bracket may be formed to be hung on a portion of the top surface of the second protruding portion, and the top surface of the lower end of the second support bracket may be formed to be hung on a portion of the bottom surface of the second protruding portion. For example, the second support bracket may have a left square bracket-shaped cross-section to receive at least a portion of the second protruding portion.

BRIEF DESCRIPTION OF THE DRAWINGS

Arrangements and embodiments may be described in detail with reference to the following drawings, in which like reference numerals refer to like elements and wherein.

DETAILED DESCRIPTION

Figure 1:
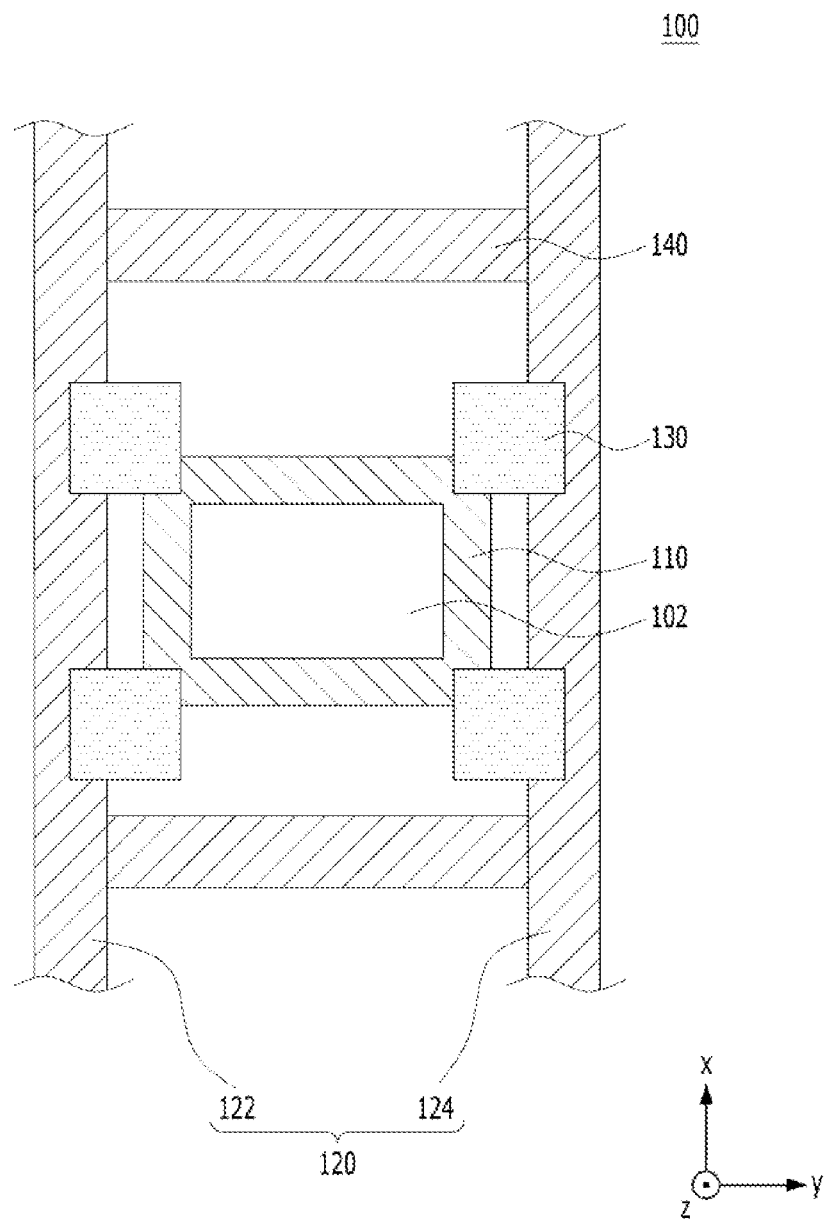
FIG. 1 is a plan view of a fuel cell vehicle according to an exemplary embodiment.

The present disclosure will now be described more fully hereinafter with reference to the accompanying drawings, in which various exemplary embodiments are shown. The examples, however, may be embodied in many different forms, and should not be construed as being limited to the exemplary embodiments set forth herein. Rather, these exemplary embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present. When an element is referred to as being "on" or "under", "under the element" as well as "on the element" may be included based on the element. In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a fuel cell vehicle 100 according to an exemplary embodiment will be described with reference to the accompanying drawings. The fuel cell vehicle 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the exemplary embodiment is not limited thereto. In other words, the x-axis, the y-axis, and the z-axis may intersect each other obliquely. For convenience of description, the ±x-axis direction will be referred to as a "first direction", the ±y-axis direction will be referred to as a "second direction", and the ±z-axis direction will be referred to as a "third direction".

FIG. 1 is a plan view of the fuel cell vehicle 100 according to the exemplary embodiment. The fuel cell vehicle 100 shown in FIG. 1 may include a fuel cell 102, a system frame (or a system-mounting frame) 110, a vehicle body part, and a fastening part 130. The fuel cell 102 is mounted to the system frame 110. As described above, the fuel cell vehicle 100 according to the exemplary embodiment may include at least one unit fuel cell.

The fuel cell 102 included in the fuel cell vehicle 100 according to an exemplary embodiment may include a single unit fuel cell, rather than multiple unit fuel cells stacked in the third direction, which is the vertical direction, or in the first and second directions, which are the horizontal directions. Alternatively, the fuel cell 102 included in the fuel cell vehicle 100 according to another exemplary embodiment may include a plurality of unit fuel cells that are stacked in at least one of the vertical direction or the horizontal direction. For example, the fuel cell 102 may include a plurality of unit fuel cells that are stacked in at least one of the first direction, the second direction, or the third direction.

The unit fuel cell may be a polymer electrolyte membrane fuel cell (or a proton exchange membrane fuel cell) (PEMFC), which has been studied most extensively as a power source for driving vehicles. However, the exemplary embodiment is not limited to any specific configuration or external appearance of the unit fuel cell. The unit fuel cell included in the fuel cell 102 may include end plates (or pressing plates or compression plates) (not shown), current collectors (not shown), and a cell stack (not shown).

The cell stack may include a plurality of unit cells, which are stacked in a width direction, e.g. in the first or second direction. Several tens to several hundreds of unit cells, e.g. about 100 to 400 unit cells, may be stacked to form the cell stack. Each unit cell may generate about 0.6 volts to 1.0 volts of electricity. Thus, the number of unit fuel cells included in the fuel cell 102 and the number of unit cells included in the cell stack of the unit fuel cell may be determined in accordance with the intensity of the power to be supplied from the fuel cell 102 to a load. Here, "load" may refer to a part of the fuel cell vehicle 100 that requires power.

The first and second end plates may be disposed at respective ends of the cell stack, and may support and fix the plurality of unit cells. In other words, the first end plate may be disposed at a first one of the two ends of the cell stack, and the second end plate may be disposed at a second one of the two ends of the cell stack. In addition, the fuel cell 102 may further include a clamping member. For example, in each unit fuel cell, the clamping member serves to clamp the plurality of unit cells together with the end plates in the horizontal direction, for example, the first or second direction.

The vehicle body part may include first and second side members (or vehicle body frames) 120 (122 and 124). The first and second side members 122 and 124 may extend in the first direction, which is a direction of vehicle travel, and may be disposed to face each other in the second direction, which intersects the first direction. The first and second side members 122 and 124 may be disposed at two opposite sides of the fuel cell 102. In particular, the first and second side members 122 and 124 may correspond to the vehicle body of the fuel cell vehicle 100. Specifically, the first and second side members 122 and 124 may correspond to the parts of the vehicle body of the fuel cell vehicle 100 that form side parts of the engine compartment.

In addition, the vehicle body part may further include at least one cross member 140. The at least one cross member 140 is a part that is disposed between the first side member 122 and the second side member 124 in the vehicle body part. The cross member 140 may be integrally formed with at least one of the first side member 122 or the second side member 124. However, the fuel cell vehicle 100 according to the exemplary embodiment is not limited as to the presence or absence of the cross member 140, the specific arrangement position thereof, or the specific arrangement form thereof The fuel cell vehicle 100 according to the exemplary embodiment may be a commercial vehicle, such as a truck, or a passenger vehicle, but the exemplary embodiment is not limited to any specific type of vehicle. If the fuel cell vehicle 100 is a commercial vehicle, the cross member 140 may serve to support at least one of a cab (not shown), a loading part (not shown), or a hydrogen storage part (not shown) of the commercial vehicle. Alternatively, the cross member 140 may not support any one of the cab, the loading part, and the hydrogen storage part, and may be omitted.

The system frame 110 may be mounted to (or supported by or connected to) at least one of the first side member 122 or the second side member 124, and serves to support at least a portion of each of the fuel cell 102 and a power controller (not shown). For example, the system frame 110 may be directly mounted to the first and second side members 122 and 124, or may be indirectly mounted to the first and second side members 122 and 124 via the fastening part 130.

Hereinafter, the fuel cell vehicle 100 according to the exemplary embodiment will be described as being structured such that the system frame 110 is indirectly mounted to the first and second side members 122 and 124 via the fastening part 130, but the embodiment is not limited thereto. In other words, the following description may also apply to a structure in which the fastening part 130 is integrated with the system frame 110 and in which the fastening part 130 of the system frame 110 is directly mounted to the first and second side members 122 and 124. Further, the following description may also apply to a structure in which the fastening part 130 is integrated with the first or second side member 122 or 124 and in which the fastening part 130 of the first or second side member 122 or 124 is directly mounted to the system frame 110.

The fastening part 130 serves to fasten the system frame 110 to each of the first and second side members 122 and 124. For example, as illustrated in FIG. 1, the fastening part 130 may fasten the corner of the system frame 110 to each of the first and second side members 122 and 124, but the exemplary embodiment is not limited thereto. In other words, the fastening part 130 may connect at least one of the corner or the edge of the system frame 110 to each of the first and second side members 122 and 124. The fastening part 130 may be plural in number. The plurality of fastening parts 130 may have the same shape as each other, or may have different shapes from each other. Hereinafter, only one of the plurality of fastening parts 130, which have the same shape as each other, will be described. Therefore, the following description may identically apply to the other fastening parts.

The positions at which the fastening parts 130 are connected to the system frame 110 may be the same as each other, or may be different from each other. In other words, the portions of the system frame 110 to which the fastening parts 130 are connected may be the same as each other, for example, the corners or the edges (or, sides) of the system frame 110. Alternatively, some of the fastening parts 130 may be connected to the corners of the system frame 110, and the remaining ones of the fastening parts 130 may be connected to the edges of the system frame 110.

As shown in FIG. 1, the system frame 110 may be indirectly fastened to the first and second side members 122 and 124 by four fastening parts 130, but the embodiment is not limited thereto. In other words, according to another exemplary embodiment, unlike what is shown in FIG. 1, a portion of the system frame 110 may be indirectly fastened to the first or second side member 122 or 124 by the fastening part 130, and the remaining portion of the system frame 110 may be directly fastened to the first or second side member 122 or 124, without using the fastening part 130 as a connection medium.

Figure 2:
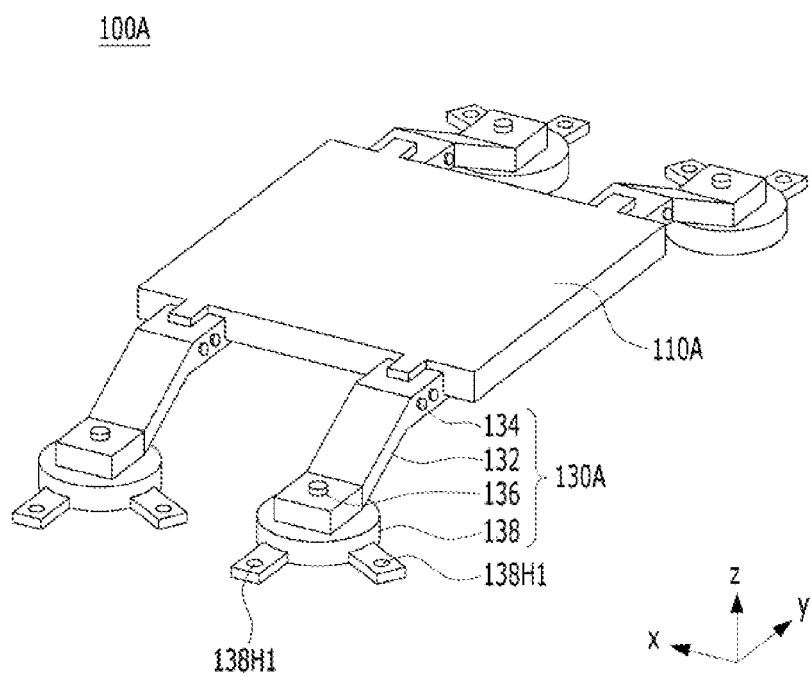
FIG. 2 is a perspective view of exemplary embodiments of the fastening part and the system frame shown in FIG. 1.

FIG. 2 is a perspective view of exemplary embodiments of the fastening part 130 and the system frame 110 shown in FIG. 1. In particular, a system frame 110A is an exemplary embodiment of the system frame 110 shown in FIG. 1, and a first fastening part 130A is an exemplary embodiment of the fastening part 130 shown in FIG. 1. For convenience of description, the fuel cell 102 and the first and second side members 122 and 124 shown in FIG. 1 are not illustrated in FIG. 2.

The first fastening part 130A may include a first support bracket (or a mount support bracket) 132, a first bolt 134, a fastening bolt 136, and an insulator (or a mount insulator or a bush) 138, but the exemplary embodiment is not limited thereto. In other words, except for the first support bracket 132 and the first bolt 134 of the first fastening part 130A, the fastening bolt 136 and the insulator 138 may have any of various shapes. The fastening bolt 136 serves to fasten the first support bracket 132 and the insulator 138. Accordingly, the fastening bolt 136 may be implemented as a stud bolt, which is inserted into a screw hole 136H, which is illustrated in FIG. 3A, to be described later, to fasten the first support bracket 132 and the insulator 138.

The insulator 138 may be disposed between the first or second side member 122 or 124 and the system frame 110 shown in FIG. 1, and may be directly connected to the first or second side member 122 or 124. Although not shown in detail, the insulator 138 may be bolted to the first or second side member 122 or 124 by inserting bolts into screw holes (e.g., bores) 138H1 and 138H2 thereof. The insulator 138 may provide insulation against vibrations. Thus, the insulator 138 may prevent or minimize the transfer of vibrations from the system frame 110 to the first and second side members 122 and 124, or may prevent or minimize the transfer of vibrations from the first and second side members 122 and 124 to the system frame 110.

Figure 3A:
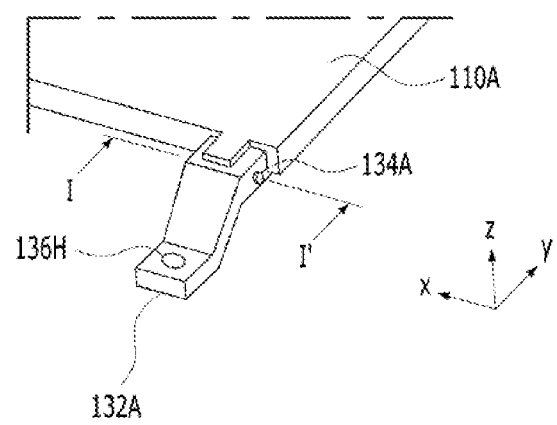
FIG. 3A is a partial perspective view showing the engagement of the system frame, the first support bracket, and the first bolt shown in FIG. 2.
Figure 3B:
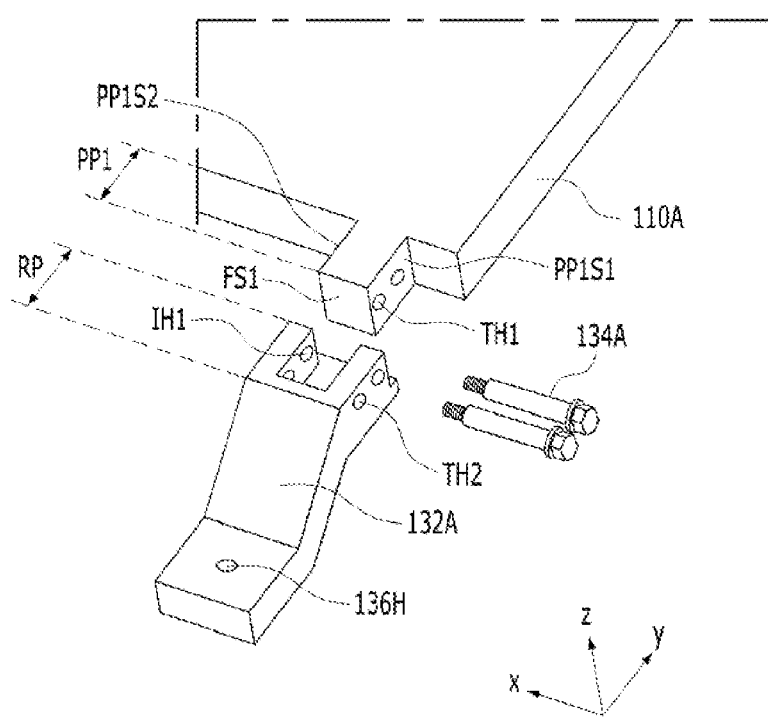
FIG. 3B is a partial exploded perspective view of the system frame, the first support bracket, and the first bolt shown in FIG. 3A.
Figure 3C:
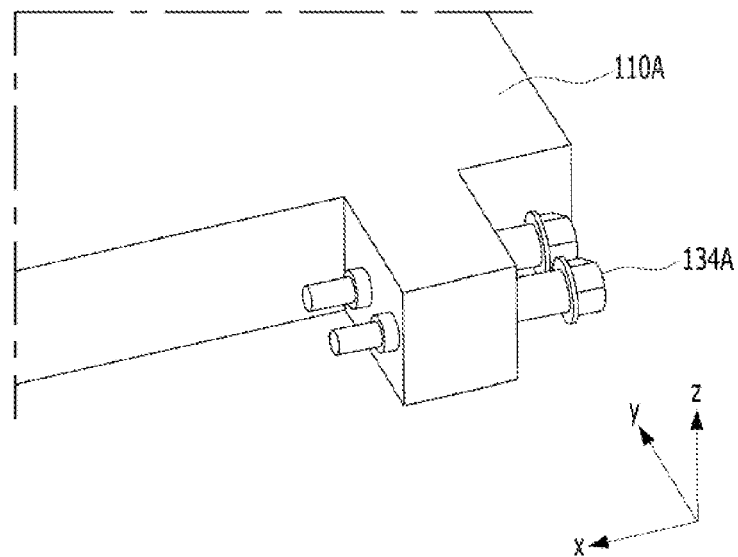
FIG. 3C is a perspective view showing the engagement of the system frame and the first bolt shown in FIG. 3A.
Figure 3D:
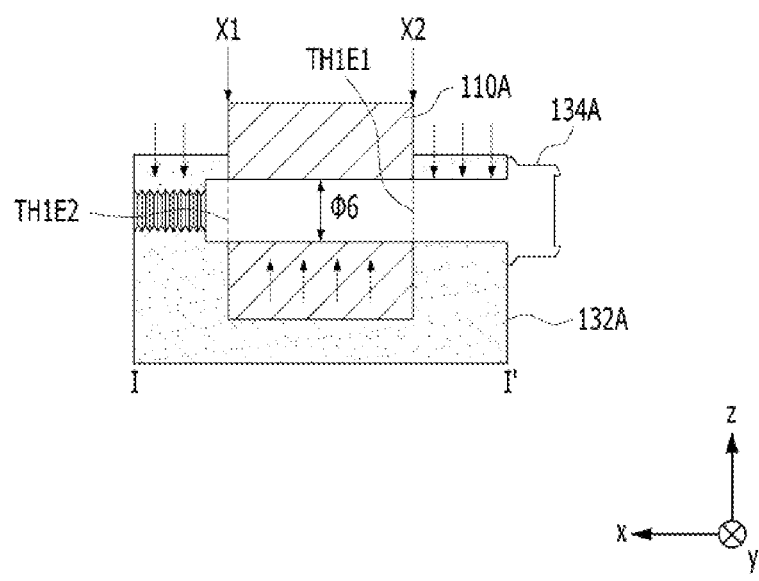
FIG. 3D is a cross-sectional view taken along line I-I' in FIG. 3A to show the engagement of exemplary embodiments of the system frame, the first support bracket, and the first bolt shown in FIG. 3A.

FIG. 3A is a partial perspective view showing the engagement of the system frame 110A, the first support bracket 132A, and the first bolt 134A shown in FIG. 2, FIG. 3B is a partial exploded perspective view of the system frame 110A, the first support bracket 132A, and the first bolt 134A shown in FIG. 3A, FIG. 3C is a perspective view showing the engagement of the system frame 110A and the first bolt 134A shown in FIG. 3A, and FIG. 3D is a cross-sectional view taken along line I-I' in FIG. 3A to show the engagement of embodiments of the system frame 110A, the first support bracket 132A, and the first bolt 134A shown in FIG. 3A.

Figure 4A:
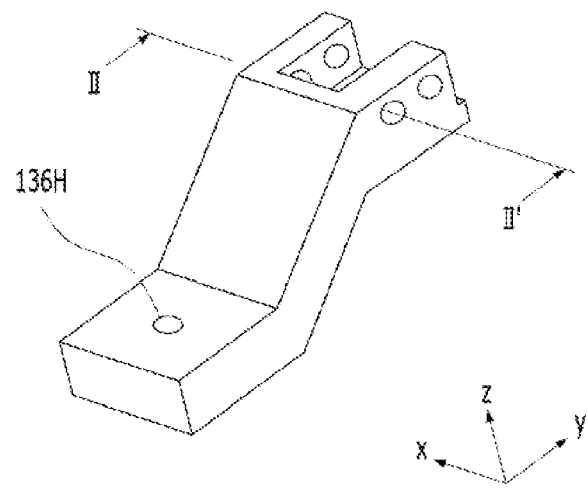
FIG. 4A is a perspective view of the first support bracket shown in FIGS. 3A, 3B and 3D.
Figure 4B:
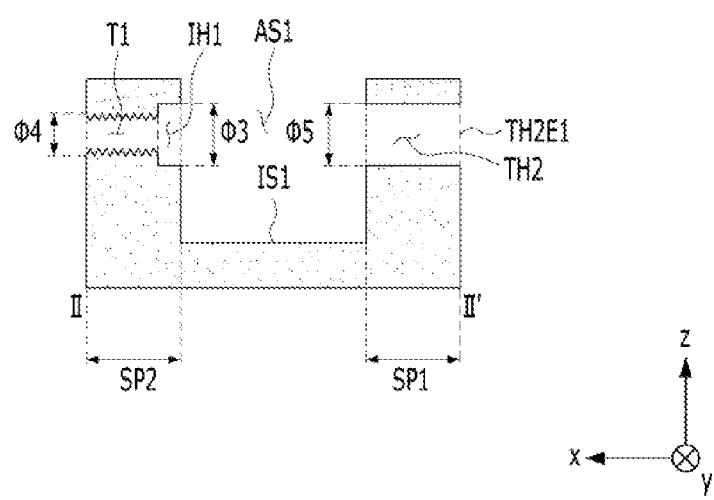
FIG. 4B is a cross-sectional view taken along line II-II' in FIG. 4A to show an exemplary embodiment of the first support bracket shown in FIG. 4A.
Figure 4C:
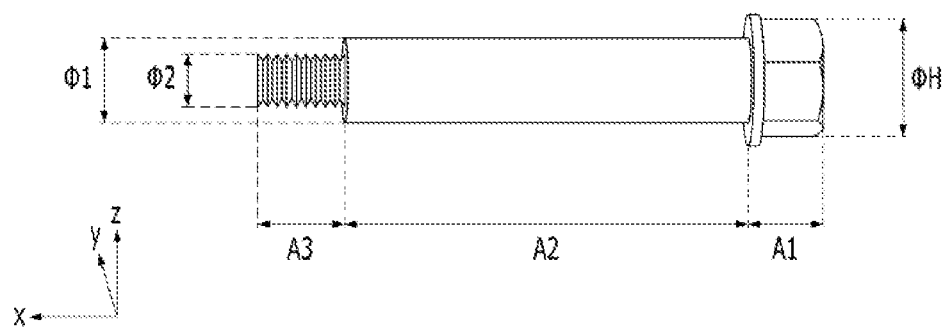
FIG. 4C is a perspective view of an exemplary embodiment of the first bolt shown in FIGS. 3A to 3D.

FIG. 4A is a perspective view of the first support bracket 132A shown in FIGS. 3A, 3B and 3D, FIG. 4B is a cross-sectional view taken along line II-II' in FIG. 4A to show an embodiment of the first support bracket 132A shown in FIG. 4A, and FIG. 4C is a perspective view of an embodiment of the first bolt 134A shown in FIGS. 3A to 3D. The first bolt 134A shown in FIGS. 3A to 3D and 4C corresponds to an exemplary embodiment of the first bolt 134 shown in FIG. 2.

According to the exemplary embodiment, one of the system frame 110A and the first support bracket 132A may include a first protruding portion, which has a convex shape and protrudes toward the other one thereof, and the other one of the system frame 110A and the first support bracket 132A may include a recessed portion to receive the first protruding portion.

Hereinafter, as shown in FIGS. 3A to 3D, the exemplary embodiment will be described as being structured such that the system frame 110A includes the first protruding portion PP1 and such that the first support bracket 132A includes the recessed portion. However, the following description may also apply to a structure in which the first support bracket 132A includes the first protruding portion PP1 and the system frame 110A includes the recessed portion.

The first protruding portion PP1 of the system frame 110A may protrude in a direction oriented toward the first support bracket 132A, for example, in the second direction. The recessed portion RP, as illustrated in FIG. 4B, may include a first inner surface IS1 and first and second side portions SP1 and SP2. The first inner surface IS1 is a surface that faces the front surface FS1 of the first protruding portion PP1.

The first side portion SP1 is a portion that faces one PP1S1 of the two opposite side surfaces PP and PP of the first protruding portion PP1 and has therein a second aperture TH2. The second side portion SP2 is a portion that faces the other one PP1S2 of the two opposite side surfaces PP1S1 and PP1S2 of the first protruding portion PP1 and has therein a first insertion hole IH1 (e.g., bore) and a first tab portion (or a threaded portion) T1.

As shown, the first inner surface IS1, the first side portion SP1, and the second side portion SP2 of the recessed portion RP may form a space AS1 receiving the first protruding portion PP1. Accordingly, as illustrated in FIG. 3A, the first protruding portion PP1 may be disposed between the first side portion SP1 and the second side portion SP2 in the horizontal direction, for example, in the first direction.

The system frame 110A may include a first aperture TH1 formed therein in the horizontal direction. For example, the horizontal direction may be a direction parallel to the first direction. The first aperture TH1 may be formed in a manner of penetrating the first protruding portion PP1 in the first direction, which is the horizontal direction. The first support bracket 132A may include therein a second aperture TH2, a first insertion hole IH1, and a first tab portion T1.

Referring to FIGS. 3D and 4B, the second aperture TH2 communicates with a first end portion TH1E1, among the two opposite end portions TH1E1 and TH1E2 of the first aperture TH1, in the horizontal direction. The first insertion hole IH1 communicates with a second end portion TH1E2, among the two opposite end portions TH1E1 and TH1E2 of the first aperture TH1, in the horizontal direction. The first tab portion T1 communicates with the first insertion hole IH1, and extends from the first insertion hole IH1 in the horizontal direction.

The first bolt 134A may include a head A1, a first shank portion A2, and a first threaded portion A3. In the first bolt 134A, the first shank portion A2 may be a portion that is inserted into the first aperture TH1, the second aperture TH2, and the first insertion hole IH1 in the horizontal direction, for example, in the first direction. The first shank portion A2 of the first bolt 134A may overlap the boundary X2 between the first end portion TH1E1 of the first aperture TH1 and the second aperture TH2, that is, the portion X2 at which the first end portion TH1E1 of the first aperture TH1 and the second aperture TH2 are in contact with each other, in the vertical direction.

In addition, the first shank portion A2 of the first bolt 134A may overlap the boundary X1 between the second end portion TH1E2 of the first aperture TH1 and the first insertion hole IH1, that is, the portion X1 at which the second end portion TH1E2 of the first aperture TH1 and the first insertion hole IH1 are in contact with each other, in the vertical direction. For example, the vertical direction may be the third direction (or a direction parallel to the third direction), intersecting each of the first and second directions.

The first bolt 134A, which is connected to one first support bracket 132A, may be one or plural in number. For example, as shown in FIGS. 2, 3A, 3B and 3C, the first bolt 134A, which is connected to one first support bracket 132A, may be two in number. The first threaded portion A3 may extend from the first shank portion A2 in the first direction, which is the horizontal direction, and may be engaged with the first tab portion T1.

Figure 5A:
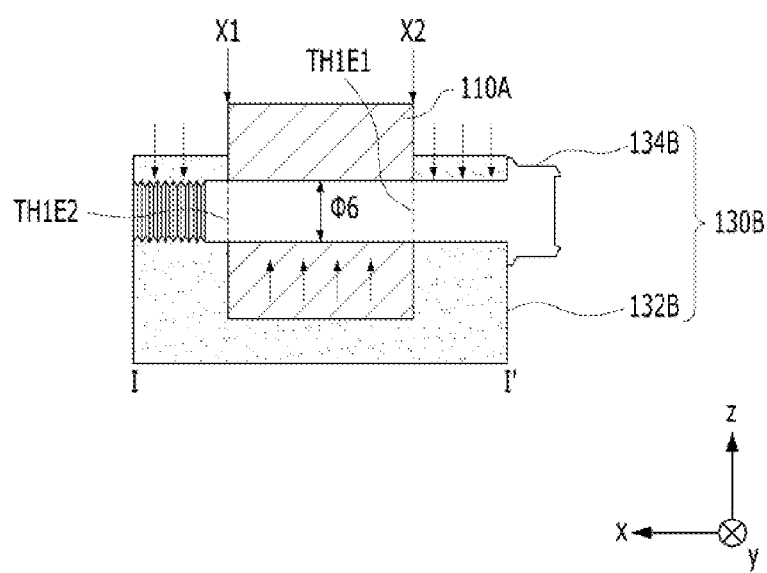
FIG. 5A is a cross-sectional view taken along line I-I' in FIG. 3A to show the engagement of other exemplary embodiments of the system frame, the first support bracket, and the first bolt shown in FIG. 3A.
Figure 5B:
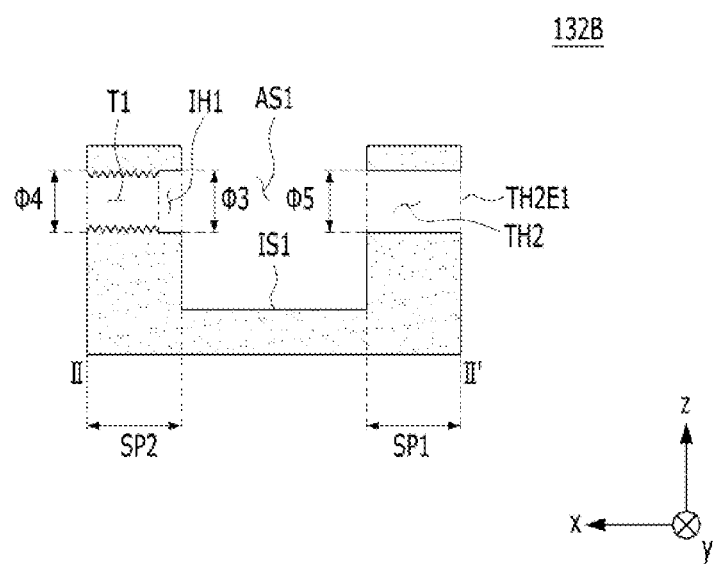
FIG. 5B is a cross-sectional view taken along line II-II' in FIG. 4A to show another exemplary embodiment of the first support bracket shown in FIG. 4A.
Figure 5C:
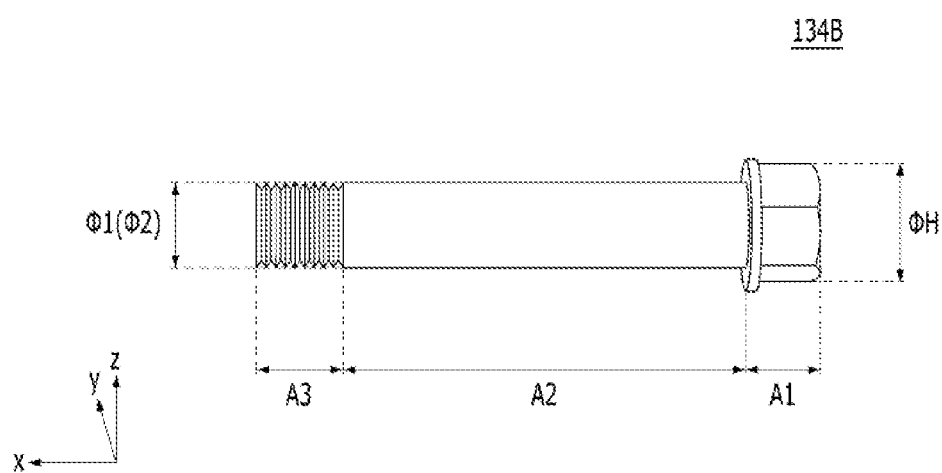
FIG. 5C is a perspective view of another exemplary embodiment of the first bolt shown in FIG. 3A.

FIG. 5A is a cross-sectional view taken along line I-I' in FIG. 3A to show the engagement of other exemplary embodiments 110A, 132B and 134B of the system frame 110A, the first support bracket 132A, and the first bolt 134A shown in FIG. 3A, FIG. 5B is a cross-sectional view taken along line II-IF in FIG. 4A to show another exemplary embodiment 132B of the first support bracket 132A shown in FIG. 4A, and FIG. 5C is a perspective view of another exemplary embodiment 134B of the first bolt 134A shown in FIG. 3A. Except for the difference between the shape of the first bolt 134B and the shape of the first support bracket 132B, the components shown in FIGS. 5A, 5B and 5C are the same as those shown in FIGS. 3D, 4B and 4C. Thus, the same components are denoted by the same reference numerals, and a duplicate description thereof will be omitted.

According to an exemplary embodiment, as illustrated in FIGS. 4B and 4C, the first shank portion A2 and the first threaded portion A3 of the first bolt 134A may have a height difference (or, step) therebetween. For example, a first diameter Ø1 of the first shank portion A2 may be greater than a second diameter Ø2 of the first threaded portion A3, and a third diameter Ø3 of the first insertion hole IH1 may be greater than a fourth diameter Ø4 of the first tab portion T1.

According to another exemplary embodiment, as illustrated in FIGS. 5B and 5C, the first shank portion A2 and the first threaded portion A3 of the first bolt 134B may not have a height difference therebetween. For example, the first diameter Ø1 of the first shank portion A2 may be the same as the second diameter Ø2 of the first threaded portion A3, and the third diameter Ø3 of the first insertion hole IH1 may be the same as the fourth diameter Ø4 of the first tab portion T1.

Referring to FIGS. 4C and 5C, the head A1 of the first bolt 134A or 134B may have a diameter ØH greater than the first diameter Ø1 of the first shank portion A2, and may be in contact with the end portion TH2E1 of the second aperture TH2. Further, the diameter Ø5 of the second aperture TH2 may be greater than the first diameter Ø1 of the first shank portion A2 of the first bolt 134A or 134B, the third diameter Ø3 of the first insertion hole IH1 may be greater than the first diameter Ø1 of the first shank portion A2 of the first bolt 134A or 134B, and the fourth diameter Ø4 of the first tab portion T1 may be greater than the second diameter Ø2 of the first threaded portion A3 of the first bolt 134A or 134B. Further, the diameter Ø6 of the first aperture TH1 may be greater than the first diameter Ø1 of the first shank portion A2 of the first bolt 134A or 134B.

Figure 6:
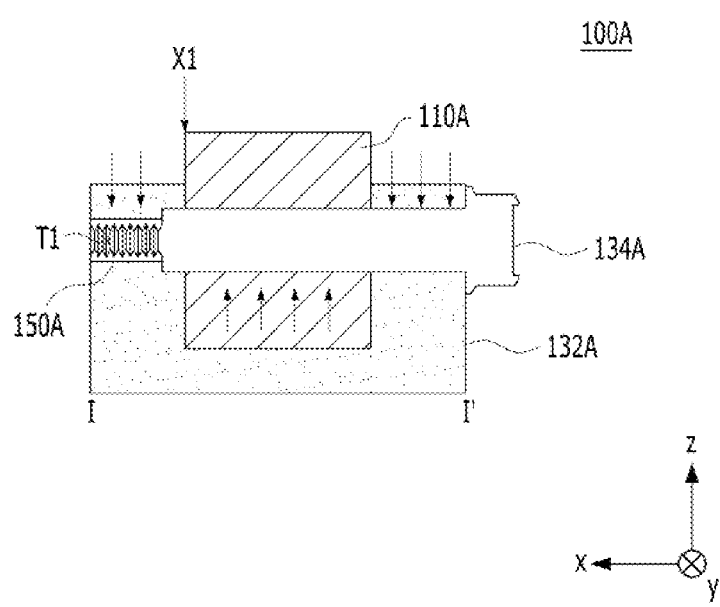
FIG. 6 is a cross-sectional view taken along line I-I' in FIG. 3A to show the engagement of still other exemplary embodiments of the system frame, the first support bracket, and the first bolt shown in FIG. 3A.

FIG. 6 is a cross-sectional view taken along line I-I' in FIG. 3A to show the engagement of still other exemplary embodiments of the system frame 110A, the first support bracket 132A, and the first bolt 134A shown in FIG. 3A. According to an exemplary embodiment, the first tab portion T1 may be formed by machining the first support bracket 132A, as shown in FIGS. 4B and 5B.

According to another exemplary embodiment, as shown in FIG. 6, the fuel cell vehicle may further include a first pipe nut 150A. The first pipe nut 150A is embedded in the first support bracket 132A, and has therein a first tab portion T1. Except for this configuration, the components shown in FIG. 6 are the same as those shown in FIG. 3D. Thus, the same components are denoted by the same reference numerals, and a duplicate description thereof will be omitted. Although not shown, the fuel cell vehicle shown in FIG. 5A may also include a first pipe nut, which has therein a first tab portion T1.

Figure 7:
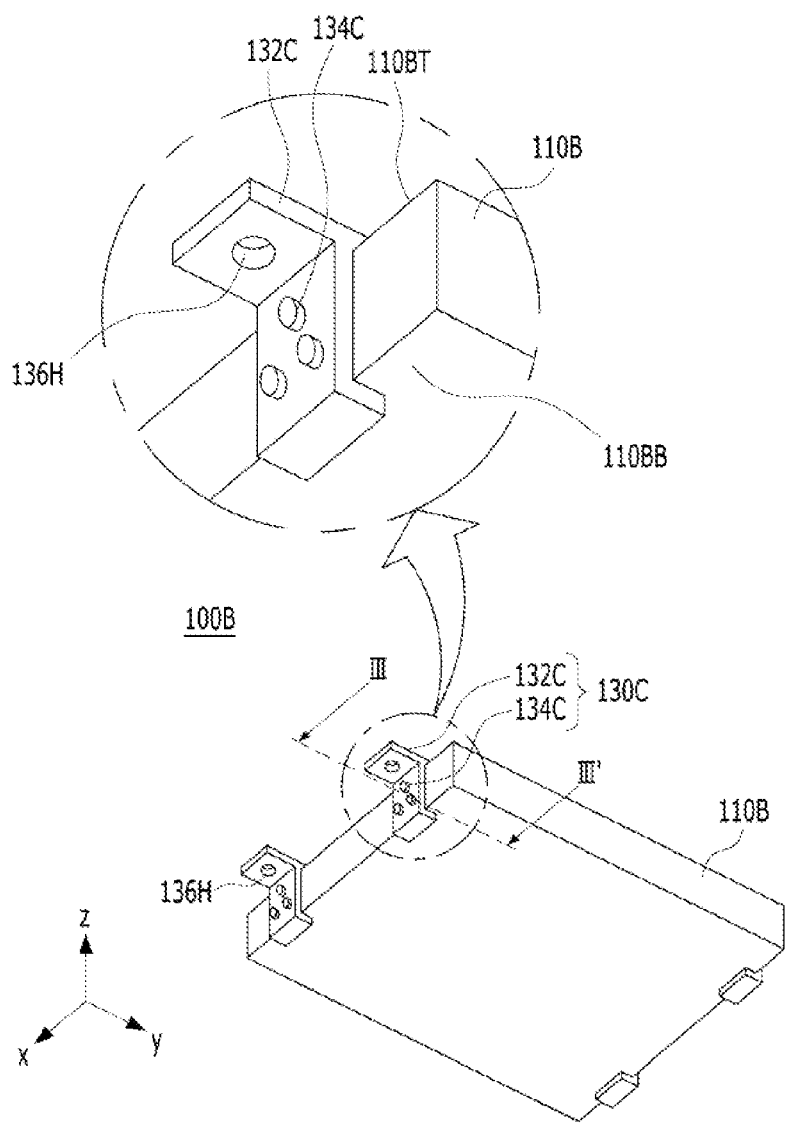
FIG. 7 is a rear perspective view of a fuel cell vehicle according to another exemplary embodiment.
Figure 8A:
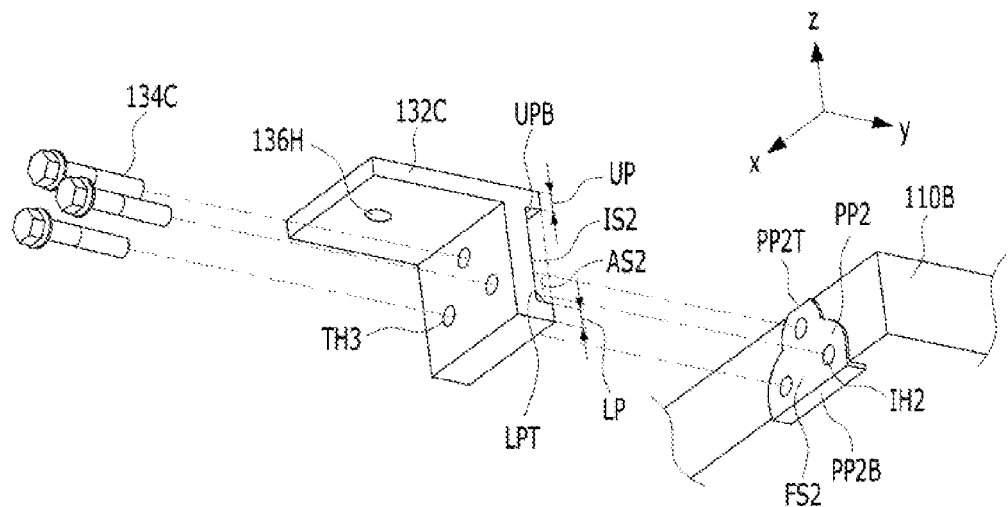
FIG. 8A is a rear exploded perspective view of an exemplary embodiment of the fuel cell vehicle shown in FIG. 7.
Figure 8B:
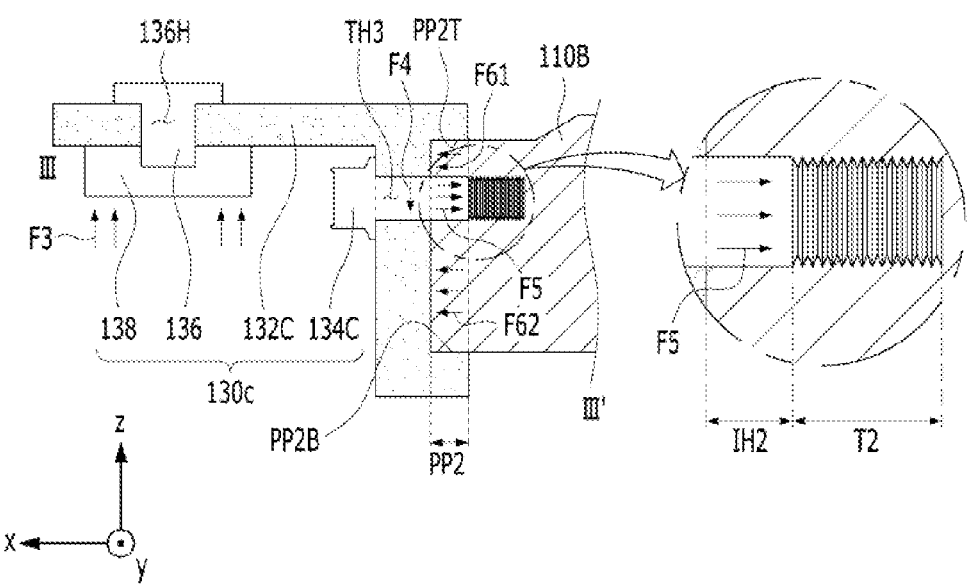
FIG. 8B is a cross-sectional view taken along line in the fuel cell vehicle shown in FIG. 7.

FIG. 7 is a rear perspective view of a fuel cell vehicle 100B according to another exemplary embodiment. FIG. 8A is a rear exploded perspective view of an exemplary embodiment of the fuel cell vehicle 100B shown in FIG. 7, and FIG. 8B is a cross-sectional view taken along line in the fuel cell vehicle 100B shown in FIG. 7. The fuel cell vehicle 100B shown in FIG. 7 may include a fuel cell (not shown), a system frame 110B, first and second side members 122 and 124, and a second fastening part 130C.

Although not shown, the fuel cell 102 of the fuel cell vehicle 100B shown in FIG. 7 may be mounted on the system frame 110B, as shown in FIG. 1, and the second fastening part 130C may connect the system frame 110B to each of the first and second side members 122 and 124 shown in FIG. 1. As described above, the fastening part 130 may fasten the corner of the system frame 110 to each of the first and second side members 122 and 124, as shown in FIG. 1, and the second fastening part 130C may fasten the edge near the corner of the system frame 110 to each of the first and second side members 122 and 124, as shown in FIG. 7.

The description of the fuel cell vehicle 100 (100A) shown in FIGS. 1 to 6 may apply equally to components of the fuel cell vehicle 100B shown in FIG. 7 that are not described or illustrated herein. In other words, except for the difference between the shape of the fastening part 130 (130A or 130B) and the shape of the second fastening part 130C, the fuel cell vehicle 100B shown in FIG. 7 is the same as the above-described fuel cell vehicle 100 (100A).

According to an exemplary embodiment, as illustrated in FIG. 8B, the system frame 110B may include therein a second insertion hole IH2 (e.g., bore) and a second tab portion T2. The second insertion hole IH2 may be formed in a second protruding portion PP2 in the horizontal direction, for example, in the first direction (or in a direction parallel to the first direction). The second tab portion T2 may be formed to extend from the second insertion hole IH2 in the horizontal direction.

According to another exemplary embodiment, unlike what is illustrated in FIG. 8B, the second insertion hole IH2 may be omitted, and a second tab portion T2 may be formed in place of the second insertion hole IH2. In particular, the second tab portion T2 may be formed in the second protruding portion PP2 in the horizontal direction. The second fastening part 130C fastens the system frame 110B to each of the first and second side members 122 and 124.

Accordingly, the second fastening part 130C may include a second support bracket 132C and a second bolt 134C. In addition, the second fastening part 130C may further include a fastening bolt 136 and an insulator 138. The fastening bolt 136 and the insulator 138 respectively correspond to and perform the same functions as the fastening bolt 136 and the insulator 138 shown in FIG. 2. Thus, the fastening bolt 136 and the insulator 138 are denoted by the same reference numerals as the fastening bolt 136 and the insulator 138 shown in FIG. 2, and a duplicate description thereof will be omitted. Further, an illustration of the fastening bolt 136 and the insulator 138 shown in FIG. 8B is omitted in FIGS. 7 and 8A.

Unlike the first fastening part 130A or 130B described above, the second fastening part 130C may be fastened to the system frame 110B in the state of holding the top surface 110BT and the bottom surface 110BB of the system frame 110B, as shown in FIG. 7. For example, the system frame 110B may further include a second protruding portion PP2, which protrudes toward the second fastening part 130C. In particular, as illustrated in FIG. 8B, the second fastening part 130C may have a concave shape to receive at least a portion of the second protruding portion PP2 by holding the top surface PP2T and the bottom surface PP2B of the second protruding portion PP2.

The second support bracket 132C of the second fastening part 130C may include therein a third aperture TH3. The third aperture TH3 may communicate with the second insertion hole IH2 in the first direction, which is the horizontal direction. If the second insertion hole IH2 shown in FIG. 8B is omitted, the third aperture TH3 may communicate with the second tab portion T2 in the first direction, which is the horizontal direction.

Like the first bolt 134A or 134B shown in FIG. 4C or 5C, the second bolt 134C may include a shank portion (hereinafter referred to as a "second shank portion") and a threaded portion (hereinafter referred to as a "second threaded portion"). The second shank portion may be inserted into the third aperture TH3 and the second insertion hole IH2 in the horizontal direction, for example, in the first direction, and the second threaded portion may be engaged with the second tab portion T2.

The second support bracket 132C may include a second inner surface IS2, an upper end UP, and a lower end LP. The second inner surface IS2 faces the front surface FS2 of the second protruding portion PP2. The upper end UP may be disposed on the second inner surface IS2, and may be in contact with the top surface PP2T of the second protruding portion PP3. The lower end LP may be disposed under the second inner surface IS2, and may be in contact with the bottom surface PP2B of the second protruding portion PP3.

The second inner surface IS2, the upper end UP, and the lower end LP may form a space AS2 for receiving the second protruding portion PP2. Accordingly, the second protruding portion PP2 may be disposed between the upper end UP and the lower end LP in the vertical direction, for example, in the third direction (or in a direction parallel to the third direction).

Figure 9:
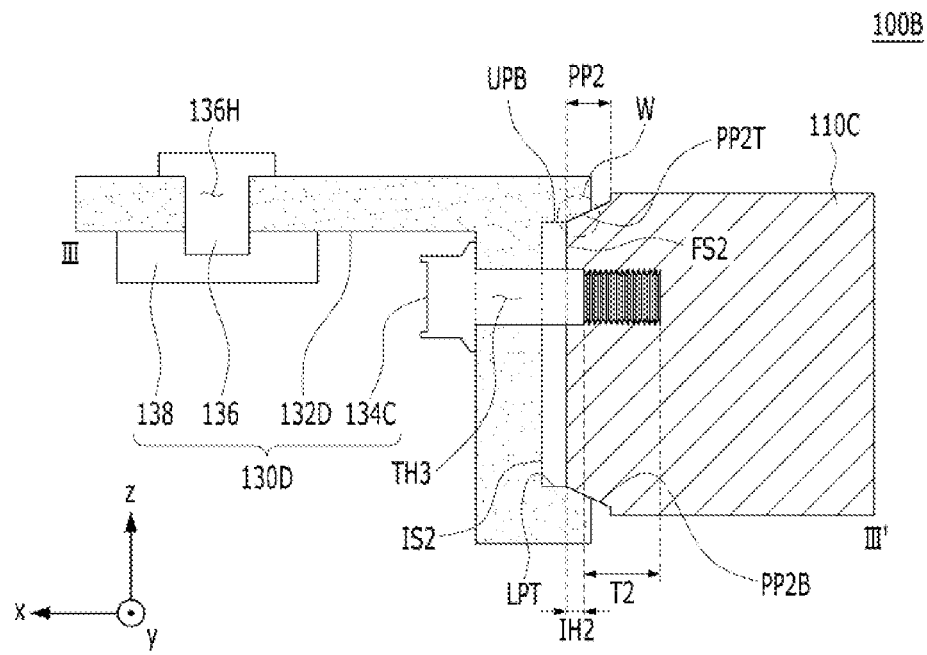
FIG. 9 is a cross-sectional view of a fuel cell vehicle according to still exemplary another embodiment.

FIG. 9 is a cross-sectional view of a fuel cell vehicle 100B according to still another exemplary embodiment. Except for the difference between the shapes of a second support bracket 132D and a system frame 110C of a second fastening part 130D shown in FIG. 9 and the shapes of the second support bracket 132C and the system frame 110B shown in FIGS. 7 to 8B, the fuel cell vehicle shown in FIG. 9 is the same as the fuel cell vehicle shown in FIG. 8B. Thus, the same components are denoted by the same reference numerals, and a duplicate description thereof will be omitted.

According to an exemplary embodiment, as shown in FIG. 8B, the second inner surface IS2 of the second support bracket 132C may be in contact with the front surface FS2 of the second protruding portion PP2. In particular, the entire area of the bottom surface UPB of the upper end UP of the second support bracket 132C may be in contact with the top surface PP2T of the second protruding portion PP2, and the entire area of the top surface LPT of the lower end LP of the second support bracket 132C may be in contact with the bottom surface PP2B of the second protruding portion PP2.

According to another exemplary embodiment, as shown in FIG. 9, the upper end UP and the lower end LP of the second support bracket 132D may be formed to be respectively caught in the top surface PP2T and the bottom surface PP2B of the second protruding portion PP2. Referring to FIG. 9, the second inner surface IS2 of the second support bracket 132D may be spaced apart from the front surface FS2 of the second protruding portion PP2 in the first direction, which is the horizontal direction. In particular, a portion of the bottom surface UPB of the upper end UP of the second support bracket 132D may be formed to be hung on the top surface PP2T of the second protruding portion PP2, and a portion of the top surface LPT of the lower end LP of the second support bracket 132D may be formed to be hung on the bottom surface PP2B of the second protruding portion PP2.

As shown in FIG. 8B or 9, the second support bracket 132C or 132D may have a left square bracket-shaped cross-section to receive at least a portion of the second protruding portion PP2. Further, the second bolt 134C, which is connected to one second support bracket 132C and 132D, may be one or plural in number. For example, as shown in FIG. 7, the second bolt 134C, which is connected to one second support bracket 132C, may be three in number.

Figure 10:
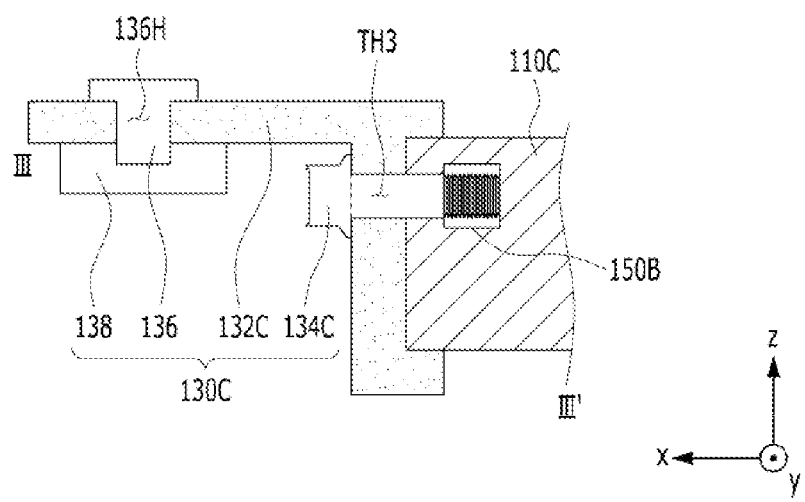
FIG. 10 is a cross-sectional view taken along line in FIG. 7 to show another exemplary embodiment of the fuel cell vehicle shown in FIG. 7.

FIG. 10 is a cross-sectional view taken along line in FIG. 7 to show another exemplary embodiment of the fuel cell vehicle 100B shown in FIG. 7. According to an exemplary embodiment, the second tab portion T2 may be formed by machining the system frame 110B or 110C, as shown in FIGS. 8B and 9.

According to another exemplary embodiment, as shown in FIG. 10, the fuel cell vehicle may further include a second pipe nut 150B. The second pipe nut 150B is embedded in the system frame 110C, and has a second tab portion T2 formed therein. Except for this configuration, the components shown in FIG. 10 are the same as those shown in FIG. 8B. Thus, the same components are denoted by the same reference numerals, and a duplicate description thereof will be omitted. Although not shown, the fuel cell vehicle shown in FIG. 9 may also include a second pipe nut, which has a second tab portion T2 formed therein.

Figure 11:
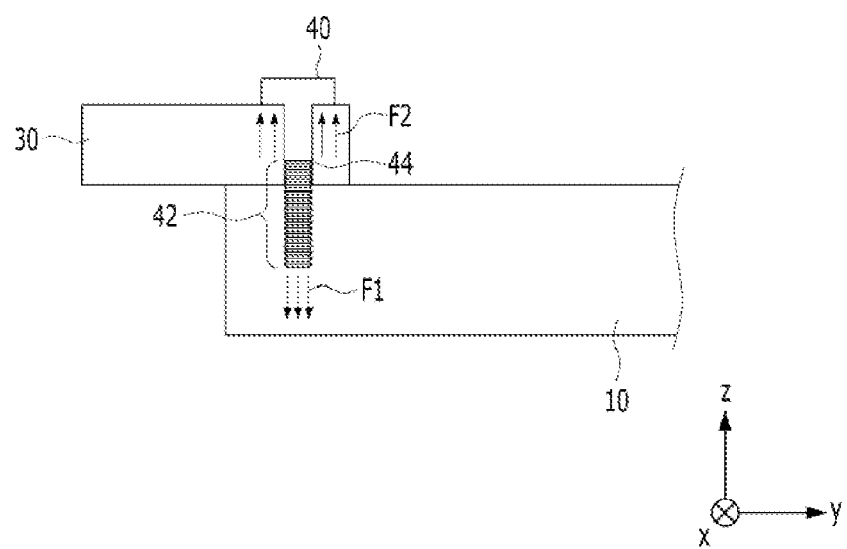
FIG. 11 is a cross-sectional view of a fuel cell vehicle according to a comparative example.

Hereinafter, a fuel cell vehicle according to a comparative example and the fuel cell vehicle according to the exemplary embodiment will be described with reference to the accompanying drawings. FIG. 11 is a cross-sectional view of a fuel cell vehicle according to a comparative example.

The fuel cell vehicle according to the comparative example may include a system frame 10, a support bracket 30, and a fastening bolt 40. In particular, since the system frame 10 and the support bracket 30 respectively perform the same functions as the system frame 110 and the first and second support brackets 130, 130A, 130B and 130C according to the exemplary embodiment, a duplicate description thereof will be omitted. In the fuel cell vehicle according to the comparative example, the system frame 10 and the support bracket 30 are coupled to each other using the fastening bolt 40.

The stud bolt 136 shown in FIG. 2 is subjected to a tensile load due to axial force for fastening, but is not subjected to the load of the weight of the fuel cell system. In particular, "fuel cell system" collectively refers to the fuel cell 102 and the system frame 110. In contrast, a tensile load due to the weight of the fuel cell system as well as a tensile load due to axial force for fastening are additionally applied to the fastening bolt 40 shown in FIG. 11. When the fuel cell vehicle travels, acceleration is applied to the vehicle body due to irregularity of the road surface in the first direction, which is a forward-backward direction in which the vehicle travels, the second direction, which is the leftward-rightward width direction of the vehicle, and the third direction, which is the upward-downward height direction of the vehicle. Particularly, when the vehicle travels on a rough road, the amplitude of acceleration in the third direction is the greatest. When the weight of the fuel cell system is "m" and the acceleration is "a", inertial force F1 is applied to the fuel cell system as expressed using Equation 1 below.

$$F1 = m \cdot a \qquad \text{Equation 1}$$

Accordingly, a fatigue load in the tensile direction due to the inertial force F1 may be applied to the fastening bolt 40 shown in FIG. 11. When the fuel cell vehicle hits a bump, for example, runs over a stone, and thus the vehicle body thereof bounces in the third direction, which is the vertical direction, a force F2 moving the support bracket 30 mounted to the vehicle body upwards is applied to the fastening bolt 40 in a direction opposite the direction in which the inertial force F1 resisting the bounce of the vehicle body is applied to the system frame 10 of the fuel cell vehicle. Accordingly, the maximum amount of tensile stress is applied to the fastening bolt 40.

The fastening bolt 40 has a plurality of notches to form the thread 42, and therefore is particularly vulnerable to fatigue when a tensile load is applied thereto. When a fatigue load is applied to the fastening bolt 40 in the vertical direction, which is the axial direction, a notch effect, i.e. concentration of stress, occurs due to the shape of the thread 42, which further increases the possibility of fatigue failure of the fastening bolt 40. Further, since a fatigue load due to traveling vibration is additionally applied to the fastening bolt 40, the risk of fatigue failure increases due to accumulation of a fatigue load in the axial direction. Accordingly, a thread starting point 44 of the fastening bolt 40 is subjected to the greatest amount of stress, which may cause the fastening bolt 40 to fracture.

In contrast, according to the fuel cell vehicle 100 (100A) according to the exemplary embodiment, when the fuel cell vehicle vibrates in the third direction, shear stress is applied to the first bolt 134A or 134B in the transverse direction, as indicated by the arrows in FIGS. 3D, 5A and 6. At this time, as shown in FIGS. 3D, 5A and 6, the shear stress is maximized at the position X1, at which the system frame 110A and the first support bracket 132A or 132B are in contact with each other in the horizontal direction (hereinafter referred to as a "maximum shear stress point"). If the first threaded portion A3 of the first bolt 134A or 134B overlaps the maximum shear stress point X1 in the third direction, which is the vertical direction, the possibility of the first bolt 134A or 134B fracturing due to fatigue failure, like the fastening bolt 40 shown in FIG. 11, may increase.

However, according to the exemplary embodiment, the first bolt 134A or 134B is fastened in the horizontal direction such that the first shank portion A2 of the first bolt 134A or 134B, which has no notch, is subjected to a repeated load in the shear direction. In other words, the first shank portion A2 of the first bolt 134A or 134B, rather than the first threaded portion A3 thereof, is disposed to overlap the maximum shear stress point X1 in the vertical direction, thereby eliminating the notch effect, thus preventing fatigue failure and fracture of the first bolt 134A or 134B.

In addition, according to the fuel cell vehicle 100B according to another exemplary embodiment, the second support bracket 132C or 132D is formed in a left square bracket-shaped structure to be caught in the top surface 110BT and the bottom surface 110BB of the system frame 110B. Thus, when the fuel cell vehicle 100B vibrates in the third direction, which is the vertical direction, most of the force (F3 shown in FIG. 8B) of pushing the second support bracket 132C or 132D upwards by the insulator 138 is attenuated by the inertial force of the fuel cell system, and thus it may be possible to minimize the shear stress (F4 shown in FIG. 8B) applied to the second bolt 134C.

Further, the vertical stress F5 applied to the second bolt 134C is in equilibrium with the force F61 and F62, with which the system frame 110B pushes the second support bracket 132C and 132D, as a force working against the axial force of fastening the second bolt 134C, and thus the influence of the traveling vibration of the fuel cell vehicle on the second bolt 134C is negligible. Therefore, the magnitude of the vertical stress applied to the second bolt 134C is not large. In particular, the second support bracket 132C or 132D supports the inertial load in the vertical upward-downward direction, so the second bolt 134C, which is fastened in the horizontal direction, serves only to perform the fastening function. Accordingly, the notch effect is minimized and the shear stress applied to the second bolt 134C is minimized, and thus the second bolt 134C is prevented from fracturing.

Furthermore, since the second support bracket 132C or 132D supports the second protruding portion PP2 of the system frame 110B in the upward-downward direction, the second bolt 134C does not support the weight or inertial force of the fuel cell system, and thus the second bolt 134C simply functions to fasten the second support bracket 132C or 132D and the system frame 110B or 110C. Consequently, according to the exemplary embodiment, it may be possible to minimize the magnitude of the stress applied to the first and second bolts 134A, 134B and 134C, thus preventing fatigue failure of the first and second bolts 134A, 134B and 134C.

Further, if the dimensions of the second support bracket 132C and the system frame 110B are not accurate, assembly thereof may be difficult. Therefore, to prevent this problem, as illustrated in FIG. 9, the bottom surface of the upper end UP of the second support bracket 132D, which slidingly contacts the top surface PP2T of the second protruding portion PP2, and the top surface of the lower end LP of the second support bracket 132D, which slidingly contacts the bottom surface PP2B of the second protruding portion PP2, are formed in the shape of a wedge W so that the second support bracket 132D is mechanically caught in the second protruding portion PP2, thereby facilitating assembly of the second support bracket 132D and the second protruding portion PP2 and allowing the second support bracket 132D and the second protruding portion PP2 to contact each other more closely.

As is apparent from the above description, the fuel cell vehicle according to the exemplary embodiment is capable of preventing fracture of the first and second bolts, which connect the system frame and the support bracket to each other, and of tightly engaging the support bracket and the system frame with each other. However, the effects achievable through the disclosure are not limited to the above-mentioned effects, and other effects not mentioned herein will be clearly understood by those skilled in the art from the above description.

The above-described various exemplary embodiments may be combined with each other without departing from the scope of the present disclosure unless they are incompatible with each other. In addition, for any element or process that is not described in detail in any of the various exemplary embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
    a system frame on which a fuel cell is mounted;
    first and second side members extending in a first direction and facing each other in a second direction intersecting the first direction, the first direction being a traveling direction of the vehicle; and
    a first fastening part configured to fasten the system frame to each of the first and second side members,
    wherein the system frame includes a first aperture formed therein in a horizontal direction, and
    wherein the first fastening part includes:
        a first support bracket comprising a second aperture communicating with a first end portion, among two opposite end portions of the first aperture, in the horizontal direction, a first insertion hole communicating with a second end portion, among the two opposite end portions of the first aperture, in the horizontal direction, and a first tab portion extending from the first insertion hole in the horizontal direction; and
        a first bolt including a first shank portion inserted into the first aperture, the second aperture, and the first insertion hole in the horizontal direction, and a first threaded portion extending from the first shank portion to be engaged with the first tab portion.

2. The fuel cell vehicle according to claim 1, wherein the first shank portion of the first bolt overlaps a boundary between the first end portion of the first aperture and the second aperture in a vertical direction, and overlaps a boundary between the second end portion of the first aperture and the first insertion hole in the vertical direction, and wherein the vertical direction is a direction that intersects each of the first direction and the second direction.

3. The fuel cell vehicle according to claim 1, wherein the first fastening part fastens a corner of the system frame to each of the first and second side members.

4. The fuel cell vehicle according to claim 1, further comprising:
    a first pipe nut embedded in the first support bracket, the first pipe nut having therein the first tab portion.

5. The fuel cell vehicle according to claim 1, wherein a first one of the system frame and the first support bracket includes a first protruding portion having a convex shape and protruding toward a second one of the system frame and the first support bracket, and wherein the second one of the system frame and the first support bracket includes a recessed portion to receive the first protruding portion.

6. The fuel cell vehicle according to claim 5, wherein the first protruding portion protrudes in the second direction.

7. The fuel cell vehicle according to claim 5, wherein:
    the system frame includes the first protruding portion,
    the first support bracket includes the recessed portion,
    the first aperture penetrates the first protruding portion in the horizontal direction,
    the recessed portion includes:
        a first inner surface facing a front surface of the first protruding portion;
        a first side portion facing a first one of two opposite side surfaces of the first protruding portion and having therein a second aperture; and
        a second side portion facing a second one of the two opposite side surfaces of the first protruding portion and having therein the first insertion hole and the first tab portion,
    the first inner surface, the first side portion, and the second side portion form a space receiving the first protruding portion, and
    the first protruding portion is disposed between the first side portion and the second side portion in the horizontal direction.

8. The fuel cell vehicle according to claim 1, wherein the first shank portion and the first threaded portion of the first bolt have a height difference therebetween.

9. The fuel cell vehicle according to claim 8, wherein a diameter of the first shank portion is greater than a diameter of the first threaded portion, and wherein a diameter of the first insertion hole is greater than a diameter of the first tab portion.

10. The fuel cell vehicle according to claim 9, wherein the first bolt includes a head having a diameter greater than the diameter of the first shank portion, the head being in contact with an end portion of the second aperture.

11. A fuel cell vehicle, comprising:
a system frame on which a fuel cell is mounted;
first and second side members extending in a first direction and facing each other in a second direction intersecting the first direction, the first direction being a traveling direction of the vehicle; and
a second fastening part configured to fasten the system frame to each of the first and second side members,
wherein the system frame includes a second protruding portion protruding toward the second fastening part, and
wherein the second fastening part has a concave shape to receive at least a portion of the second protruding portion by holding a top surface and a bottom surface of the second protruding portion.

12. The fuel cell vehicle according to claim 11, wherein the system frame includes:
a second insertion hole formed in the second protruding portion in a horizontal direction; and
a second tab portion extending from the second insertion hole in the horizontal direction, and
wherein the second fastening part includes:
a second support bracket having therein a third aperture communicating with the second insertion hole in the horizontal direction; and
a second bolt having a second shank portion, inserted into the third aperture and the second insertion hole in the horizontal direction, and a second threaded portion, engaged with the second tab portion.

13. The fuel cell vehicle according to claim 12, further comprising:
a second pipe nut embedded in the system frame, the second pipe nut having therein the second tab portion.

14. The fuel cell vehicle according to claim 12, wherein the second support bracket includes:
a second inner surface facing a front surface of the second protruding portion;
an upper end disposed on the second inner surface, the upper end being in contact with the top surface of the second protruding portion; and
a lower end disposed under the second inner surface, the lower end being in contact with the bottom surface of the second protruding portion,
wherein the second inner surface, the upper end, and the lower end form a space receiving the second protruding portion, and
wherein the second protruding portion is located between the upper end and the lower end in a vertical direction.

15. The fuel cell vehicle according to claim 14, wherein:
the second inner surface of the second support bracket is in contact with a front surface of the second protruding portion,
a bottom surface of the upper end of the second support bracket is in contact with an entire area of the top surface of the second protruding portion, and
a top surface of the lower end of the second support bracket is in contact with an entire area of the bottom surface of the second protruding portion.

16. The fuel cell vehicle according to claim 14, wherein the upper end and the lower end of the second support bracket are formed to be respectively caught in the top surface and the bottom surface of the second protruding portion.

17. The fuel cell vehicle according to claim 16, wherein:
the second inner surface of the second support bracket is spaced apart from the front surface of the second protruding portion in the horizontal direction,
a bottom surface of the upper end of the second support bracket is formed to be hung on a portion of the top surface of the second protruding portion, and
a top surface of the lower end of the second support bracket is formed to be hung on a portion of the bottom surface of the second protruding portion.

18. The fuel cell vehicle according to claim 12, wherein the second support bracket has a left square bracket-shaped cross-section to receive at least a portion of the second protruding portion.

* * * * *